United States Patent
Baumann

(10) Patent No.: US 9,719,601 B2
(45) Date of Patent: Aug. 1, 2017

(54) CANTED, SINGLE VANE, THREE-WAY BUTTERFLY VALVE

(71) Applicant: Hans D. Baumann, W. Palm Beach, FL (US)

(72) Inventor: Hans D. Baumann, W. Palm Beach, FL (US)

( * ) Notice: Subject to any disclaimer, the term of this patent is extended or adjusted under 35 U.S.C. 154(b) by 0 days.

(21) Appl. No.: 14/121,025

(22) Filed: Jul. 22, 2014

(65) Prior Publication Data

US 2016/0025232 A1   Jan. 28, 2016

(51) Int. Cl.
*F16K 11/052* (2006.01)
*F16K 11/08* (2006.01)
*F16K 11/087* (2006.01)

(52) U.S. Cl.
CPC .......... *F16K 11/0525* (2013.01); *F16K 11/08* (2013.01); *F16K 11/0873* (2013.01)

(58) Field of Classification Search
CPC .................................................. F16K 11/0525
See application file for complete search history.

(56) References Cited

U.S. PATENT DOCUMENTS

| | | | |
|---|---|---|---|
| 2,351,613 A | 6/1944 | Hopkins | |
| 3,592,221 A | 7/1971 | Worley | |
| 3,721,265 A | 3/1973 | Hoffland | |
| 4,273,157 A | 6/1981 | Ludwig | |
| 5,105,853 A | 4/1992 | Lie | |
| 5,193,572 A | 3/1993 | Le Devehat | |
| 5,967,185 A * | 10/1999 | Baruschke | B60H 1/00485 137/625.29 |
| 6,216,737 B1 | 4/2001 | Taylor | |
| 6,497,250 B1 * | 12/2002 | Johann | F16K 11/076 137/625.46 |
| 7,255,129 B2 | 8/2007 | Lopez | |
| 8,011,186 B2 * | 9/2011 | McEwan | F01N 11/002 123/562 |
| 9,062,594 B2 * | 6/2015 | Robinson | F02B 37/004 |
| 2013/0228247 A1 * | 9/2013 | Baumann | F16K 11/0525 137/887 |

* cited by examiner

*Primary Examiner* — Jessica Cahill
*Assistant Examiner* — Daphne M Barry

(57) ABSTRACT

A canted, single vane three-way butterfly valve having a T-shaped housing having an inlet and one outlet port, a third port straddling said inlet and outlet ports, a single vane interspaced between the inlet and outlet ports supported by a central shaft, capable to selectively blocking fluid flow emanating from either inlet or outlet ports from entering said third port when the plenary axis of said vane is tilted forty five degrees from the central axis of either inlet or outlet ports.

7 Claims, 2 Drawing Sheets

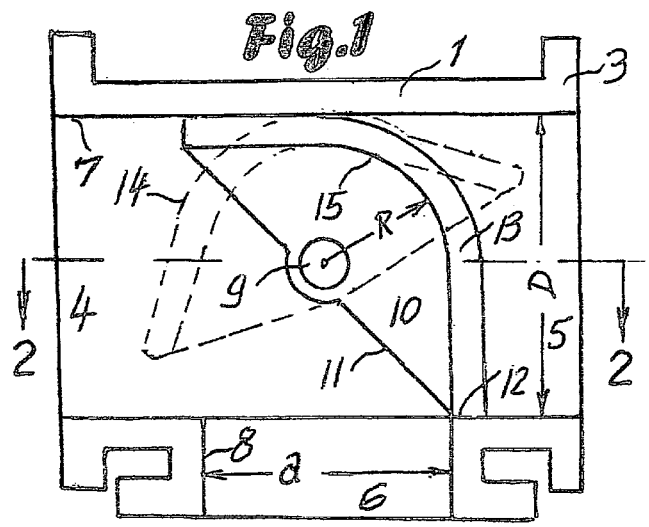
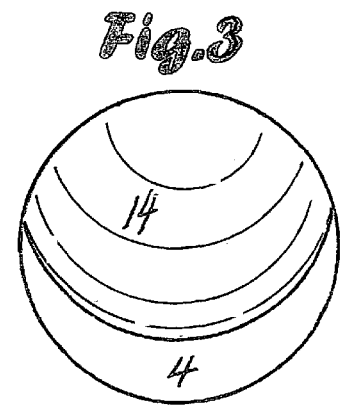
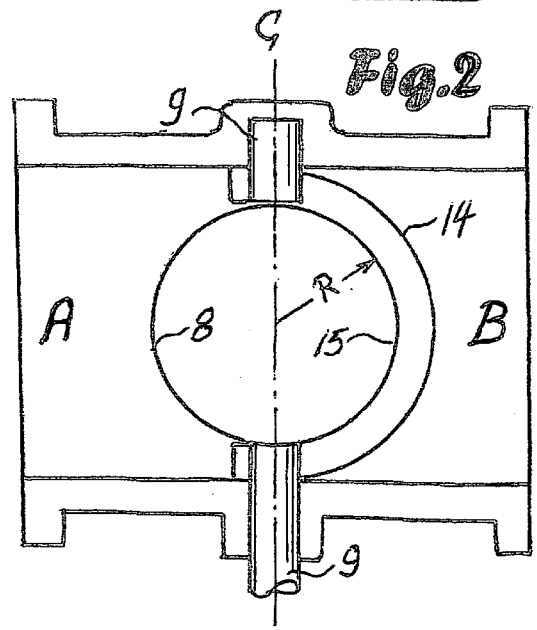
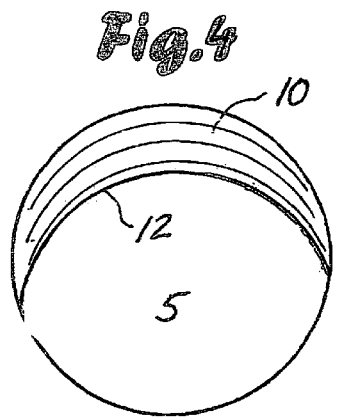

CANTED, SINGLE VANE, THREE-WAY BUTTERFLY VALVE

This valve design represents a low cost solution for applications in present process control to control temperature or to mix or blend dissimilar fluids. Three-way valves are the preferred valve type for such applications. Ideal automatic control systems, as described, demand a linear relationship between controller signal and fluid flow in order to achieve a stable control system. This, in turn, requires a three-way valve where the two controlled ports are balanced. That is, where, at any given travel position, the flow area of one port plus the flow area of the second port is always the same total areas, thus guaranteeing a constant flowing quantity through the third port.

In addition, the current design is very simple, requires few parts and requires no bonnet openings and other leak-prone valve openings other than for a rotating shaft passage.

Similar butterfly valves, such as represented by U.S. Pat. No. 6,216,737 B1, require two separate vanes of conventional shape connected by an external linkage drive. These valves are cumbersome and expensive. Each vane has a diverse flow characteristic due to their diverse locations on a pipe tee.

My invention does not require such complex shapes and can make-do with one single vane able to control flow through two separate ports at the same time. Other three-way designs are in the shape of a plug valve as exemplified by U.S. Pat. No. 3,721,265. This valve experiences rubbing friction when the plug is rotated. Such friction is absent in my invention. Furthermore, the flow passages are very restricted limiting flow.

Yet, another prior art device is shown in U.S. Pat. No. 3,592,221. While this device constitutes a rotary three-way valve, it can only switch from one port to the other and is not able to modulate the rate of two flows simultaneously, as is the purpose and function of my device.

In addition, there is a three-way butterfly valve shown in U.S. Pat. No. 4,273,157. Here is a vane, while seating at an angle, is not able to rotate 90 degrees and shut off two separate, but identical, ports. Port (26) is a small by-pass opening and is only closed, when vane (17) has nearly fully opened seat (27). It does not teach the modulation and control of fluid from and to identical ports.

U.S. Pat. No. 5,193,572, showing a single, rotatable vane in a three-way housing configuration. Here, the single vane (30) is meant to evacuate fluid from a horizontal pipe (50). No three-way control functions are implied.

In reference to cited patent by Hopkins, U.S. Pat. No. 2,351,613, while in appearance similar to the subject invention, his vane has limited flow capacity yielding, at best, only sixty percent of the total area of the common discharge port (see drawing FIG. 5). This makes his flow characteristic (rate of flow change at given travel) very non-linear. In addition, the limited flow capacity renders this design uneconomical. Furthermore, there is un-controllable flow on top of his vane and between his two horizontal ports whenever his vane is in the open position. This makes a controlled blending of two fluids impossible.

As to Lopez, U.S. Pat. No. 7,255,125, his three-way valve has no butterfly vane, and instead, offers a rotating curved element in form of a split tubing sliding in front of two circular ports. He offers no similarity to the invented spherically indented vane. Besides being very complicated, the resultant flow areas are in form of an ellipse (see drawing FIGS. 7 and 8). This results in un-equal flow areas between ports, yielding a very non-linear relationship. In addition, this design offers no tight shut-off due to sliding clearances. Finally, the discharge through each controlled openings is rather abrupt and no streamlined passages are provided, thus creating pressure loss.

There is no element of Lopez that can be imported or made part of the current invention.

Finally, Lie, U.S. Pat. No. 5,105,853, offers a semi-circular vane suitable only for conducting flow to either of two ports. There is no tight shut-off and his vane, not being balanced, is subject to high dynamic torques.

My invention overcomes all these disadvantages by providing a simple, low weight, and low cost solution to three-way modulating process applications exhibiting the following features which distinguishes from prior art:

Tight Shut-Off
  Un-interrupted flow from two flow directions
  Used for both mixing and diverting service
  Identical totaling flow areas from opposed directions regardless of travel
  Discourages by-pass of fluid from normal throttling areas
  Streamlined flow passages from either of opposed ports into discharge port
  Unrestricted flow areas between opposed ports to discharge port.

Finally, there is no contact between vane and housing, other than in the closed position. This means absence of rotating friction (other than in the shaft bearings), a great feature, when used for automatic control purposes.

These, and other advantages of my invention will become more clear, when viewing the accompanying drawing and the following description.

BRIEF DESCRIPTION OF THE DRAWINGS

FIG. 1 is a longitudinal sectional view of the invention in a configuration, where a flow passage is opened between port A and C. A partial opening at about twenty degrees from closure at port A is indicated by dashed lines.

FIG. 2 is a cross-sectional view taken along the lines 2-2 in FIG. 1.

FIG. 3 is a view into port A when the vane is about twenty degrees from closing port A showing a crescent-shaped flow opening.

FIG. 4 showing the opposite side of the vane in a view from port B. It indicates a crescent shaped closure having an identical area as the opening in FIG. 3.

DETAILED DESCRIPTION

Figure 5:
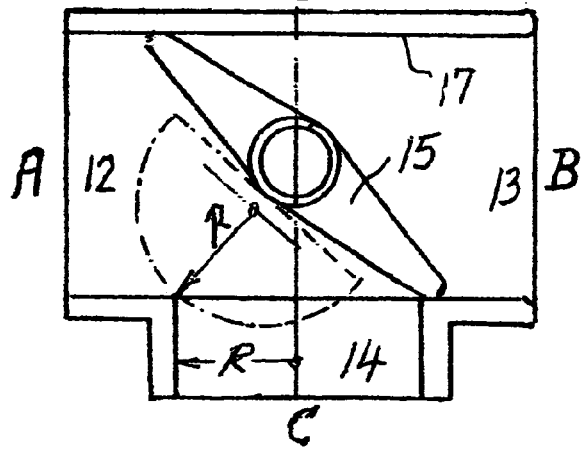
FIG. 5 Showing a single flat vane in a three-way valve configuration of prior art indicating the maximum projected flow area as dashed lines.

FIG. 1 showing a preferred embodiment of my invention comprises a housing (1), having three flanged openings (3), labeled A, B, and C with fluid access ports (4), (5), and (6) respectively. Ports (4) and (5) are connected to a horizontal, straight circular bore (7), while port (6) has a vertical bore (8) intersecting with bore (7).

Suitable shafts (9) located perpendicular to and at the intersection of bores (7) and (8). A rotable vane (10) is mounted on said shafts and having a planary oval surface (11) having a circular periphery (12) matching that of the horizontal bore (7). Said circular periphery (12) is capable of closing fluid from passing from either of the horizontal ports when said planary axis of vane (10) is tilted at an angle of about forty-five degrees from the vertical axis of port C.

The planary surface (11) has a bulging indentation (13), whose outer radius (14) closely matches the radius of bore (7), thus restricting the flow of fluid from ports A and B around the curved portion of vane (10).

The inner, concave portion (15) in a form of a semisphere; the radius R of which is identical to the radius of vertical bore (8).

While FIG. 1 shows vane (10) in a position, where fluid from port A has full and streamlined access to port C; a full ninety degrees counterclockwise rotation of the vane will provide access from port B, while closing preventing fluid from passing from port A. Dotted lines in FIG. 1 indicate an in-between throttling position at about twenty degrees away from closing port A. At this point, there is a seventy degree opening towards port B. The respective flow passages are illustrated in FIGS. 3 and 4. As can be seen, the total of the exposed flow areas in either figure is equal to the full circular area of bore diameter D. This relationship is true for every vane position between zero and ninety degrees. This assures a true linear relationship between flow rates and vane position.

One of the unique features of the invention is, that the valve is equally suitable for diverting (fluid arriving from port C is selectively distributed through ports A or B), or mixing service (different fluids arriving from ports A and B and then exit together through port C).

FIG. 5 illustrates a State of The Art three-way valve by Hopkins (U.S. Pat. No. 2,351,613) being similar to the subject invention in that his vane (15) has a forty-five degree shut-off position. However, the shape of the vane is flat. The draw-back of such a device is first, a severe restriction of flow capacity. This is illustrated by the dashed lines showing the projected flow area when the vane is fully open. Depending on the thickness of the vane such area only totals between fifty and sixty percent of the total area of port C. This is an economical restriction. Associated with this problem is the fact that these flow areas hardly change between the vane's position shown and at being half open. This makes the valve unsuitable for automatic modulating controls. Secondly, there is an unrestricted passage between the housing bore (17) and the upper vane surface allowing communication between ports A and B, whenever the vane is partly open,
leading to uncontrollable mixing of separate fluids.

Figure 7:
FIG. 7 indicates a view into port A when the circular element is about twenty degrees open indicating an elliptical flow opening.
Figure 6:
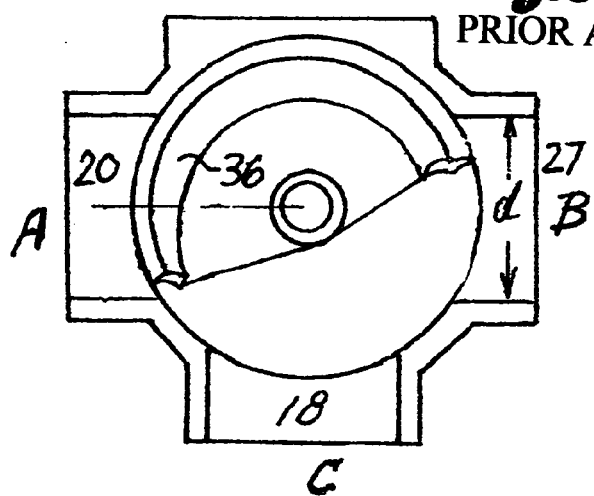
FIG. 6 Depicting another three-way valve configuration featuring a semi-circular element where half circular terminal openings intersect circular orifices.
Figure 8:
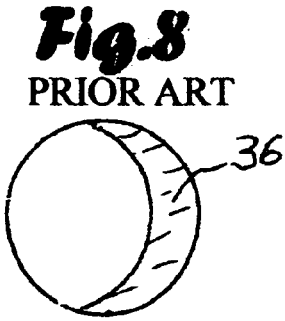
FIG. 8 showing the opposite side by viewing port B indicating an exposed flow area between the overlapping segment and port B, which when added to the flow area shown in FIG. 7 is smaller than the total area of port B, indicating a non-linear relationship.

FIG. 6 shows the cross-sectional view of a prior art device from Lopez (U.S. Pat. No. 7,255,129). This device has no vane but a rotable device (36) encompassing a semi-circular tube, whose curved, terminal surfaces selectively expose ports A and B (20 and 22). Tight shut-off of either port is not possible due to sliding clearances between housing bore (16) and the circular device. In the illustration the circular device is shown in an about twenty degree opening towards port A. This corresponds to a seventy degree opening for port B. FIGS. 7 and 8 show the resultant configurations of each respective flow area. It is now apparent, that both respective flow areas do not add up to the full circular area described by diameter d. This is due to the elliptical shape of each flow area and makes the relationship between flow and vane travel non-linear, a detriment to automatic control.

While the invention has been shown in a preferred configuration, numerous modifications may be made without departing from the scope of the following claims. For example, the vane could be designed to intersect the valve housing at sixty degrees instead of forty-five degrees, thus allowing a travel of sixty instead of ninety degrees.

The invention claimed is:

1. A canted, single vane, three-way butterfly valve, comprising a housing having an inlet port, an outlet port, a straight bore connecting both inlet and outlet ports, a third port located perpendicular to said straight bore, a tiltable vane having an oval plenary surface, a shaft located near the center of said plenary surface and being supported by suitable openings within said housing, said shaft being capable of rotating said vane of about ninety degrees to either side preventing fluid from passing from the inlet port to the third port, or, from the outlet port to said third port, the said vane has a central, spherical indentation constituting an inner wall configured to help guide fluid from the central straight bore into the third port, and wherein the radius of said spherical indentation matches the radius of said perpendicular third port, said spherical indentation has an outer wall surface which geometry closely matches the wall surface of the straight housing bore in order to discourage fluid flow from by-passing the outer periphery of said vane when it is controlling desired fluid flow between horizontal ports and said perpendicular third port.

2. A canted, single vane, three-way butterfly valve as in claim 1, wherein the outer circumference of the oval-shaped vane comprises a seating rim having a triangular cross-section to contact the inner circumference of the straight bore.

3. A canted, single vane, three-way butterfly valve as in claim 2 wherein the sum of the exposed areas between the seating rim of the vane and the openings of either inlet port or outlet port always are constant regardless of the angular rotation of the vane, thus assuring a linear relationship between the angular rotation of said vane and the rate of fluid passing said third port.

4. A canted, single vane, three-way butterfly valve as in claim 1, wherein the three ports of said housing have flanges suitable to be connected to fluid conducting pipe lines.

5. A canted, single vane, three-way butterfly valve as in claim 1, wherein one portion of said shaft extends to the outside of said housing to connect to suitable operating means.

6. A canted, single vane, three-way butterfly valve as in claim 1, wherein said vane is capable of tilting around the central longitudinal axis of the shaft passing through said vane thereby selectively and simultaneously exposing openings in said inlet and outlet ports and wherein the sum of the thus exposed areas remains constant regardless of the degree of angular rotation of said vane.

7. A canted, single vane, three-way butterfly valve as in claim 1, wherein a substantial portion of the vane has the shape of a segmented sphere wherein the outer spherical radius originates at the center of said shaft and at the longitudinal axis of the straight bore connecting both said inlet and outlet ports.

* * * * *